United States Patent [19]
Hartley et al.

[11] Patent Number: 4,668,128
[45] Date of Patent: May 26, 1987

[54] RIGIDIFICATION OF SEMI-SOLID AGGLOMERATIONS

[75] Inventors: Tyrus W. Hartley; Dwight N. Hartley, both of Bay City, Mich.

[73] Assignee: Soli-Tech, Inc., Kawkawlin, Mich.

[21] Appl. No.: 627,878

[22] Filed: Jul. 5, 1984

[51] Int. Cl.[4] ................................................. E02D 3/12
[52] U.S. Cl. .................................... 405/266; 405/128
[58] Field of Search ................ 405/53, 128, 129, 263, 405/266, 267; 175/66

[56] References Cited
U.S. PATENT DOCUMENTS 4,338,134  7/1982  Munster ........................ 405/128 X
4,460,292  7/1984  Durham et al. ..................... 405/129

FOREIGN PATENT DOCUMENTS 2430371  1/1976  Fed. Rep. of Germany ...... 405/128
2950462  6/1981  Fed. Rep. of Germany ...... 405/128
  20215  2/1981  Japan ................................. 405/129

Primary Examiner—David H. Corbin
Attorney, Agent, or Firm—Learman & McCulloch

[57] ABSTRACT

A method of rigidifying semi-solid agglomerations resulting from the drilling of an oil or gas well comprises mixing the agglomerations with a hygroscopic powder and a cementitious binder to produce a rigid, form-stable matrix.

16 Claims, 5 Drawing Figures

RIGIDIFICATION OF SEMI-SOLID AGGLOMERATIONS

This invention relates to the rigidification of semi-solid agglomerations of the kind resulting from the drilling of oil and gas wells.

BACKGROUND OF THE INVENTION

In the drilling of an oil or gas well it is conventional to employ a drilling rig to power a rotary, hollow drill pipe at the lower end of which is a drill bit which is advanced downwardly into the earth. Operation of the drilling apparatus is accompanied by the delivery of water to the upper end of the drill pipe and under such force as to cause the water to flush the cuttings from the bottom of the bore and return and carry them to the surface. Conventionally, the water is supplemented with clayey material commonly referred to as drilling mud. The drilling mud may contain a number of ingredients, including fresh or salt water, so as to render the mud sufficiently plastic to flow while retaining sufficient body or viscosity to effect sealing of the walls of the well bore and to maintain in suspension the drill cuttings as the latter are moved upwardly of the well bore. Typical muds are provided by Wyoming bentonite or sodium montmorillonite. Another clay commonly used for mud is attapulgite.

The particular kind of clay or similar substance used for a drilling mud will depend upon a number of factors which are of no particular significance to the method herein disclosed. All of the materials used for drilling muds, however, have the common characteristic that, when the drilling operations are completed, the spent muds are agglomerated with well cuttings and liquids, usually brine, in a semi-solid slurry or mass having no form stability or structural strength and a consistency similar to that of toothpaste with a funnel test viscosity of between about 40 to 60 sec./l.

At the completion of well drilling operations a large quantity of the agglomerated materials must be disposed of. These materials may not simply be scattered about the well site, or even collected in a pit adjacent the drilling site, for several reasons. One reason is that the chlorides from the brine will contaminate the soil and adjacent ground waters. Another reason is that, since the agglomeration has no appreciable stability, it is not possible to restore the ground to the condition it had prior to the excavation of the pit. That is, excavated earth cannot simply be returned to the pit with the agglomerated materials inasmuch as the latter would ooze from the pit and result in the formation of a quagmire.

Because of the difficulties encountered heretofore in disposing of well cuttings and materials associated therewith at the well site, it has been the practice to load such materials in tank trucks and transport them to a central disposal site. The time and expense of such practice make the cost of such disposal exorbitant.

SUMMARY OF THE INVENTION

The method according to the invention is especially adapted for use in disposing of residues from the drilling of oil and gas wells at the well site and in such manner as to avoid ecological contamination and at the same time enabling the land adjacent the drilling site to be restored to its original appearance and use.

In the practice of the method aqueous agglomerated residues from a well drilling operation are discharged to a pit that has been excavated adjacent the well site and which has been lined with a moisture impervious liner. The agglomerated materials are permitted to settle, following which excess liquid is removed. A powdery meal, composed of a hygroscopic powder and a cementitious binder, is mixed with the agglomerated material, following which some of the aggregate resulting from the excavation of the pit is mixed with the mixture of agglomerated materials and meal. The powder of the meal will absorb the moisture and encapsulate the solids, whereas the cementitious material will bind the encapsulated solids together to form a rigid matrix. After appropriate curing of the matrix the latter may be covered with other aggregate remaining from the excavation of the pit, whereupon the rigidified matrix not only will provide support for the covering material, but also support for tractors and other machinery, thereby enabling the site of the pit to be farmed or otherwise used. The excess of the aggregate material resulting from the excavation of the pit may be distributed over a wider area or, if desired, hauled away for other purposes.

THE DRAWINGS

A process of solidifying the semi-solid residues from well drilling operations is disclosed in the following description and illustrated in the accompanying drawings, wherein.

THE PREFERRED EMBODIMENT

Figure 1:
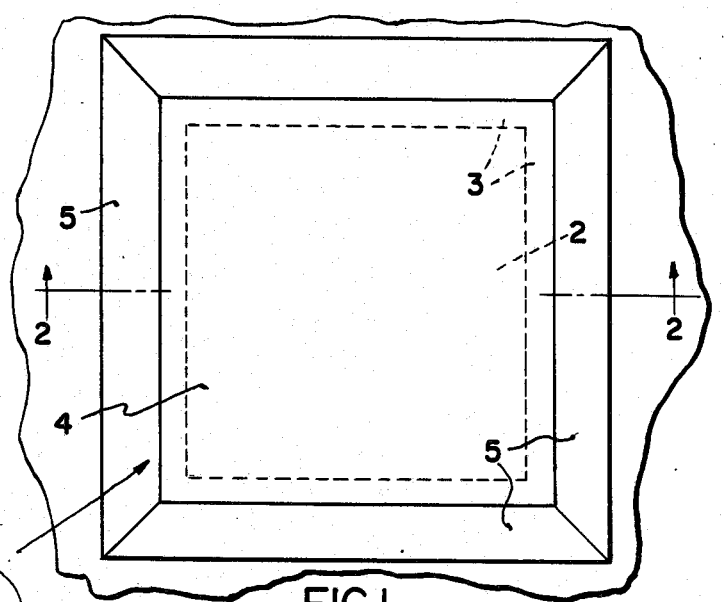
FIG. 1 is a top plan view of a typical pit that has been excavated adjacent a well-drilling site.
Figure 2:
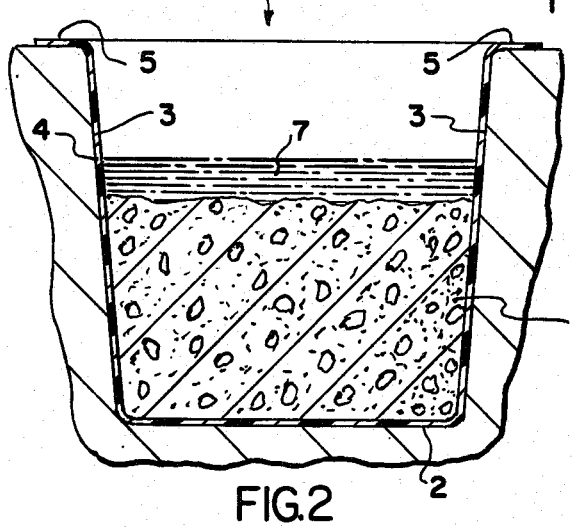
FIG. 2 is a sectional view taken on the line 2—2 of FIG. 1 and illustrating one stage of the method.
Figure 3:
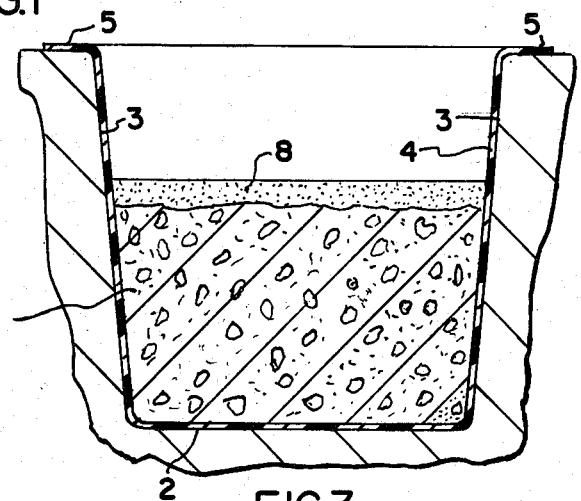
FIGS. 3-5 are views similar to FIG. 2 but illustrating successive stages in the performance of the method.
Figure 4:
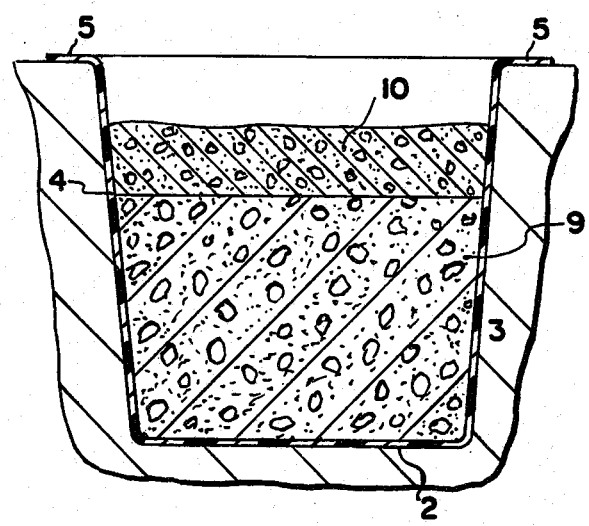
Figure 5:
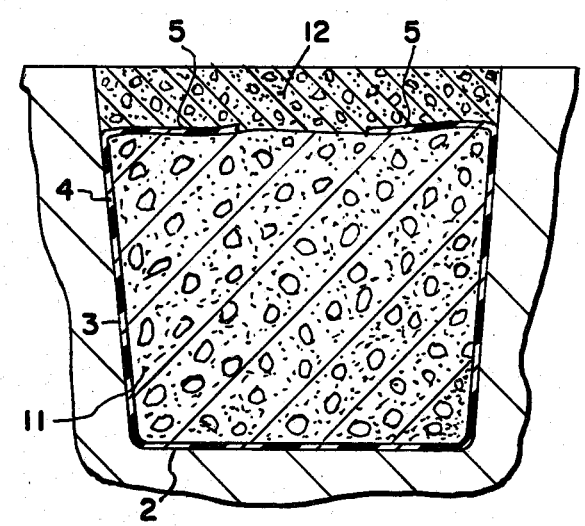

Preparatory to the practice of the method according to the invention an open top enclosure or pit 1 is excavated adjacent the site at which an oil or gas well is to be drilled. The pit 1 preferably is square in plan view, but can be of any other shape. The pit also preferably has a flat bottom 2 and downwardly sloping side walls 3. Again, however, the particular shape of the pit's bottom and side walls may vary. It is preferred, however, that the pit have a regular, geometric configuration, thereby facilitating computation of the pit's volume.

Following excavation of the pit, a moisture impervious liner 4 formed of polyvinylchloride or the like is placed in the pit so as to span the bottom, cover the side walls, and extend away from the pit over the upper surface of the adjacent ground. The marginal edges 5 of the liner thus form a protective apron adjacent the upper marginal edges of the pit.

In the drilling of a well it is conventional practice to utilize fluids and clayey materials, referred to as drilling muds, to assist in the support of the drill pipe and to flush chips or cuttings from the bottom of the bore for discharge from the mouth of the bore. In the process of drilling it is common for the drill to pass through levels containing brine which becomes mixed with the mud and cuttings and is discharged from the mouth of the bore as an aqueous agglomeration. These materials conventionally are delivered to a settling tank from which some portion of the mud may be reclaimed for recirculation through the well bore. Eventually, however, the used mud becomes spent and must be replaced with fresh mud. The spent mud, along with cuttings, brine, and other materials resulting from the the drilling operation are discharged to the pit 1, thereby enabling the settling tank to be used repeatedly during the drilling operation.

At the conclusion of the drilling operation the remaining contents of the settling tank are discharged to the pit 1, but the depth of the pit preferably is 3-6 feet greater than the height of the materials discharged to the pit. These materials comprise a semi-solid agglomeration 6 composed of the liquid-saturated mud, the cuttings, and the liquids. The liquids conventionally constitute a brine which, in some sections of the country, is composed of about 75% water and 25% water soluble sodium chloride and other soluble salts. The constituency of the brine is not critical to the method, although it is desirable that the brine contain a high percentage of chlorides.

Following discharge of the agglomeration and liquids to the pit, the materials are permitted to stand for a period of time, such as one to two days, more or less, to permit the denser fractions of the contents to settle to the bottom of the pit. This will result in the provision of a layer of excess liquid 7 atop the agglomeration 6. Thereafter, the excess liquid is pumped into tank trucks or the like and transported elsewhere for disposal. The residue in the pit still contains a high percentage of liquid, as a consequence of which the agglomeration comprises a slurry having a consistency corresponding substantially to that of toothpaste and no appreciable stability or load bearing strength.

Following removal of the layer of excess liquid from the pit, a meal 8 is added to the contents of the pit 1. Preferably, the meal is delivered to the site in a truck equipped with pneumatic discharge means which feeds the meal to a portable cyclone mounted at the free end of a boom carried by a crawler-type vehicle which has a backhoe. The vehicle may traverse the perimeter of the pit so as to discharge the meal in a substantially uniform layer over the entire surface of the pit's contents. For best results, the width of the pit should not be so great that the boom cannot reach at least half way across the pit.

The meal 8 comprises a mixture of cement kiln dust (CKD) and a cementitious binder such as Type I cement. CKD is a waste product resulting from the manufacture of cement. In the United States alone CKD accumulates at the rate of several million tons per year and represents a significant pollution control problem confronting the cement industry. CKD is not a hazardous waste, but is produced in euch large volume that it poses a severe disposal problem. Some commercial uses have been proposed for CKD, such as its being used as a substitute for lime, but the extent of such usage thus far has been relatively small in comparison to its production. Utilization of CKD as a major constituent of the meal used in the process according to the invention represents the largest commercial use of CKD presently known.

Following the addition of the layer of meal 8 to the pit's contents, the meal and the agglomeration 6 are mixed mechanically by means of the aforementioned backhoe to form a substantially homogenous mixture 9. The mixing causes the CKD, which is highly hygroscopic, to encapsulate the solids of the agglomeration. The mixing also causes the cement phase of the meal to coat the encapsulated solids and serve as a binder therebetween.

Following mixing of the agglomeration and the meal, the mixture 9 may be allowed to cure, but it is preferred to combine the mixture with an aggregate 10. The aggregate may comprise the earth, stones, gravel, sand, clay, and the like which were excavated in the formation of the pit 1. The aggregate may be added to the pit by means of backhoes, bulldozers, and the like and is mixed with the mixture of agglomeration and meal by means of backhoes until there is a substantially homogenous mass 11. The combined amount of meal, binder, and aggregate added to the pit is insufficient to overflow the latter. The solids of the agglomeration 6 and the solids of the aggregate 10 will be encapsulated by the CKD and coated with the cement. Following formation of the mass 11, the latter is permitted to cure and form a rigid matrix. The curing time will vary according to climatic conditions, but a period of 12 to 24 hours usually is sufficient to enable the mass to rigidify adequately. The presence of chloride as a constituent of the mass accelerates the curing thereof.

A field test for rigidification of the matrix may be performed by the use of a backhoe. The boom of the backhoe may be extended over the pit and the bucket at the free end of the boom placed atop the matrix. The boom then may be extended. If the bucket enters the matrix, curing is incomplete. If the crawler vehicle on which the boom is carried is caused to tilt, however, then curing is complete. The matrix formed according to the invention conforms to the compaction requirements of the Resource Conservation and Recovery Act of 1976 (RCRA).

In some jurisdictions it is required to cover the matrix with a moisture impervious liner. If so, the marginal edges 5 of the liner may be turned inwardly so as to overlie the upper surface of the matrx. Any unlined area which may exist then may be covered by an additional liner. Thereafter, additional aggregate 12 resulting from the excavation of the pit may be used to fill the pit. The excavated material in excess of that which can be returned to the pit then may be distributed over the adjacent area or trucked elsewhere.

The method according to the invention enables the pit site to be returned to its original condition following drilling operations with the exception that the site includes the buried, rigid matrix. The rigidity of the matrix is sufficient to support farm vehicles, thereby enabling the land to be farmed if desired.

Cement kiln dust furnished by a number of cement manufacturers has been used in the practice of the process. Although the specific chemical analysis of each manufacturer's CKD may vary, and successive batches from each manufacturer often also may vary, the variations are relatively small and do not appear to have any effect on the rigidification of the agglomeration.

A chemical analysis of CKD used in the method and furnished by one cement manufacturer is as follows:

| Compound | Weight Percent |
| --- | --- |
| CaO | 51.64 |
| $SiO_2$ | 14.76 |
| $Al_2O_3$ | 4.64 |
| $Fe_2O_3$ | 1.97 |
| MgO | 1.56 |
| $SO_3$ | 10.30 |
| $K_2O$ and $Na_2O$ | 3.26 |

An analysis of another manufacturer's CKD used in the method is as follows:

| Compound | Weight Percent |
|---|---|
| CaO | 44.86 |
| $SiO_2$ | 13.94 |
| $Al_2O_3$ | 4.25 |
| $Fe_2O_3$ | 2.61 |
| MgO | 2.74 |
| $SO_3$ | 7.05 |
| $K_2O$ and $Na_2O$ | 4.90 |

An average analysis of all CKDs used thus far is as follows:

| | |
|---|---|
| CaO | 49.0% |
| $SiO_2$ | 15.3% |
| $Al_2O_3$ | 3.8% |
| $Fe_2O_3$ | 2.3% |
| MgO | 2.2% |
| $SO_3$ | 8.7% |
| $K_2O$ and $Na_2O$ | 4.2% |

All of the CKDs used thus far include a substantial quantity of oxides which react with liquids in the agglomeration to form water insoluble hydroxides.

Chemical analyses of typical agglomerated materials delivered to the pit 1 revealed that solids constituted about 54% of such materials and the remainder of the material was a brine composed of about 25% calcium, potassium, and sodium chlorides and traces of other minerals.

The specific proportions of ingredients used in the method according to the invention may vary according to the kinds of drilling muds and liquids used, as well as the kinds and particle sizes of the well cuttings and the aggregate used. In practice it has been found that the following ranges of proportions of the most commonly used materials produce satisfactory results:

| Material | Weight Percent |
|---|---|
| Drilling mud | 70-75 |
| Cement kiln dust | 4-11 |
| Cement | 0.3-1.0 |
| Aggregate | 20-25 |

The particular order in which the materials are mixed does not appear to make any significant difference in the effectiveness of the method. It is easier to obtain a good mixture of the agglomeration and the meal by mixing them prior to the addition of the aggregate, however, because of the fluidity of the agglomeration and the lower quantity of meal compared to that of the aggregate.

Neither is it necessary to place the meal atop the agglomeration prior to mixing. The meal could be added to and mixed with the agglomeration in buckets-full, and the same observation applies to the addition and mixing of the aggregate. Applying these materials in layers, however, facilitates the measurement of the respective materials.

Once the agglomeration is in condition for solidification, i.e., it has settled and the excess liquid has been removed, it requires only between about 2 and 3 hours to mix about 1,050,000 pounds of agglomerated materials with about 70,000 pounds of meal and about 325,000 pounds of aggregate. The method, therefore, is relatively quickly performed with consequent economy.

This disclosure is representative of a presently preferred embodiment of the invention, but is intended to be illustrative rather than definitive thereof. The invention is defined in the claims.

What is claimed is:

1. In a method of rigidifying a semi-solid agglomeration of solids and liquids such as that resulting from the drilling of a well and contained in a pit excavated adjacent the well site, said agglomeration having a depth less than that of said pit, the improvement comprising permitting the agglomeration within said pit to stand for a period of time sufficient to cause heavier solids to settle and excess liquids to accumulate atop such agglomeration; removing at least a substantial portion of said excess liquids; adding to and mixing with the agglomeration in said pit a quantity of hygroscopic meal, a cementitious binder, and earthen aggregate resulting from the excavation of said pit to form a substantially homogeneous mass, the quantity of said meal, said binder, and said aggregate added to said agglomeration being insufficient to overflow said pit; and curing said mass to form a substantially rigid matrix.

2. A method according to claim 1 wherein the quantities of solids and liquids in said agglomeration are such that it has the consistency of a slurry having no substantial structural strength.

3. A method according to claim 1 including covering the bottom and sides of said pit with a moisture impervious liner prior to introducing said agglomeration into said pit.

4. A method according to claim 1 wherein said pit has a depth greater than the height of said matrix, and including covering said matrix with additional aggregate excavated in the formation of said pit.

5. A method according to claim 4 including covering said matrix with a moisture impervious liner prior to covering said matrix with said additional aggregate.

6. A method according to claim 1 wherein said agglomeration comprises between about 70 and 75 weight percent of said mass.

7. A method according to claim 1 wherein said meal comprises between about 4 and 11 weight percent of said mass.

8. A method according to claim 1 wherein said aggregate comprises between about 20 and 25 weight percent of said mass.

9. A method according to claim 1 wherein said binder comprises between about 0.3 and 1.0 weight percent of said mass.

10. A method according to claim 1 wherein said meal is composed of a powder containing a substantial quantity of oxides which react with liquids in said agglomeration to form water insoluble hydroxides.

11. A method according to claim 10 wherein said quantity of oxides includes calcium oxide.

12. A method according to claim 1 wherein said agglomeration includes brine.

13. A method according to claim 1 wherein said agglomeration includes drilling mud, well cuttings, and brine.

14. A method according to claim 1 wherein said meal comprises cement kiln dust and said cementitious binder comprises cement.

15. A method according to claim 1 wherein said agglomeration comprises between about 70 and 75 weight percent of said mass, said meal comprises between about 4 and 11 weight percent of said mass, said aggregate comprises between about 20 and 25 weight percent of said mass, and said cementitious binder comprises between about 0.3 and 1.0 weight percent of said mass.

16. In a method of rigidifying a semi-solid agglomeration of solids and liquids contained in a pit having a depth greater than that of said agglomeration, said method comprising permitting the agglomeration within said pit to stand for a period of time sufficient to cause heavier solids to settle and excess liquids to accumulate atop such agglomeration; removing at least a substantial portion of said excess liquids; adding to and mixing with the agglomeration in said pit a quantity of hygroscopic meal, a cementitious binder, and earthen aggregate to form a substantially homogeneous mass, the quantity of said meal, said binder, and said aggregate added to said agglomeration being insufficient to overflow said pit; and curing said mass to form a substantially rigid matrix.

* * * * *